United States Patent
Underdal et al.

(10) Patent No.: US 7,643,916 B2
(45) Date of Patent: Jan. 5, 2010

(54) VEHICLE STATE TRACKING METHOD AND APPARATUS FOR DIAGNOSTIC TESTING

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 576 days.

(21) Appl. No.: 11/452,243

(22) Filed: Jun. 14, 2006

(65) Prior Publication Data

US 2007/0293999 A1 Dec. 20, 2007

(51) Int. Cl.
*G06F 19/00* (2006.01)
(52) U.S. Cl. .......................................... 701/29; 701/36
(58) Field of Classification Search ................ 701/29, 701/33–3; 702/182–183; 340/438–439
See application file for complete search history.

(56) References Cited

U.S. PATENT DOCUMENTS 4,985,857 A * 1/1991 Bajpai et al. ................ 702/184
5,127,005 A 6/1992 Oda et al.
5,631,831 A 5/1997 Bird et al.
6,006,146 A * 12/1999 Usui et al. .................... 701/29

FOREIGN PATENT DOCUMENTS

GB 2329943 A 4/1999

OTHER PUBLICATIONS

U.S. Appl. No. 11/052,118, filed Feb. 8, 2005, Fountain, et al.

* cited by examiner

*Primary Examiner*—Yonel Beaulieu
(74) *Attorney, Agent, or Firm*—Baker & Hostetler LLP

(57) ABSTRACT

A vehicle state tracker tracks the state of a vehicle during a diagnostic test sequence to eliminate redundant steps between diagnostic procedures. The vehicle state tracker maintains a list of preconditions required for each diagnostic procedure, reads a current vehicle state from a memory register and verifies the current setting of the vehicle state corresponding to a specific precondition. If the precondition is required and the current setting is not valid, the state tracker further formats a test preparation step corresponding to the precondition for display to instruct a vehicle technician to satisfy the precondition. Otherwise, if the precondition is not required and the corresponding setting is valid, the state tracker formats an instruction to reverse the corresponding vehicle condition. The state tracker additionally receives feedback indicating when a precondition has been satisfied or the corresponding vehicle condition has been reversed, and updates the vehicle state in memory.

22 Claims, 3 Drawing Sheets

VEHICLE STATE TRACKING METHOD AND APPARATUS FOR DIAGNOSTIC TESTING

FIELD OF THE INVENTION

The present invention relates generally to diagnostic equipment. More particularly, the present invention relates to tracking a vehicle state during a diagnostic test sequence, such as a vehicle diagnostic test sequence, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

Some existing diagnostic systems have a disadvantage in that each diagnostic procedure in a sequence of diagnostic procedures includes test preparation steps without regard to the preceding diagnostic test procedures. As a result, when performing the diagnostic procedures, the vehicle technician may return the vehicle to a default starting configuration at the end of an individual diagnostic procedure, only to realize that the following test procedure requires one or more of the same test preparation steps. This process can result in the expenditure of unnecessary time, cost and duplication of effort. Accordingly, it is desirable to provide a method and apparatus for tracking the state of a vehicle during a sequence of diagnostic test procedures in a format that can be executed on a PC-based diagnostic system.

SUMMARY OF THE INVENTION

The foregoing needs are met, to a great extent, by the present invention, wherein in one aspect an apparatus and method are provided that in some embodiments can track the state of a vehicle during a sequence of diagnostic test procedures in a format that can be executed on a PC-based diagnostic system.

In accordance with one aspect of the present invention, a computer-implemented method of tracking a state of a vehicle during a diagnostic test sequence can include determining a precondition required for a diagnostic test, reading a state register and verifying a current first setting of the state register corresponding to the precondition. In addition, the method can include specifying a first test preparation step related to the precondition based on the first setting being invalid.

In accordance with another aspect of the present invention, a computer program product for tracking a state of a vehicle during a diagnostic test sequence, including a computer-readable medium encoded with instructions configured to be executed by a processor in order to perform predetermined operations that can include determining a precondition required for a diagnostic test, reading a state register and verifying a current first setting of the state register corresponding to the precondition. In addition, the predetermined operations can include specifying a first test preparation step related to the precondition based on the first setting being invalid.

In accordance with yet another aspect of the present invention, a diagnostic tool for tracking a state of a vehicle during a diagnostic test sequence can include a precondition determiner configured to determine a precondition required for a diagnostic test, a state reader configured to read a state register and a setting verifier configured to verify a state register. In addition, the diagnostic tool can include a test preparation step specifier configured to specify a first test preparation step related to the precondition based on the first setting being invalid.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
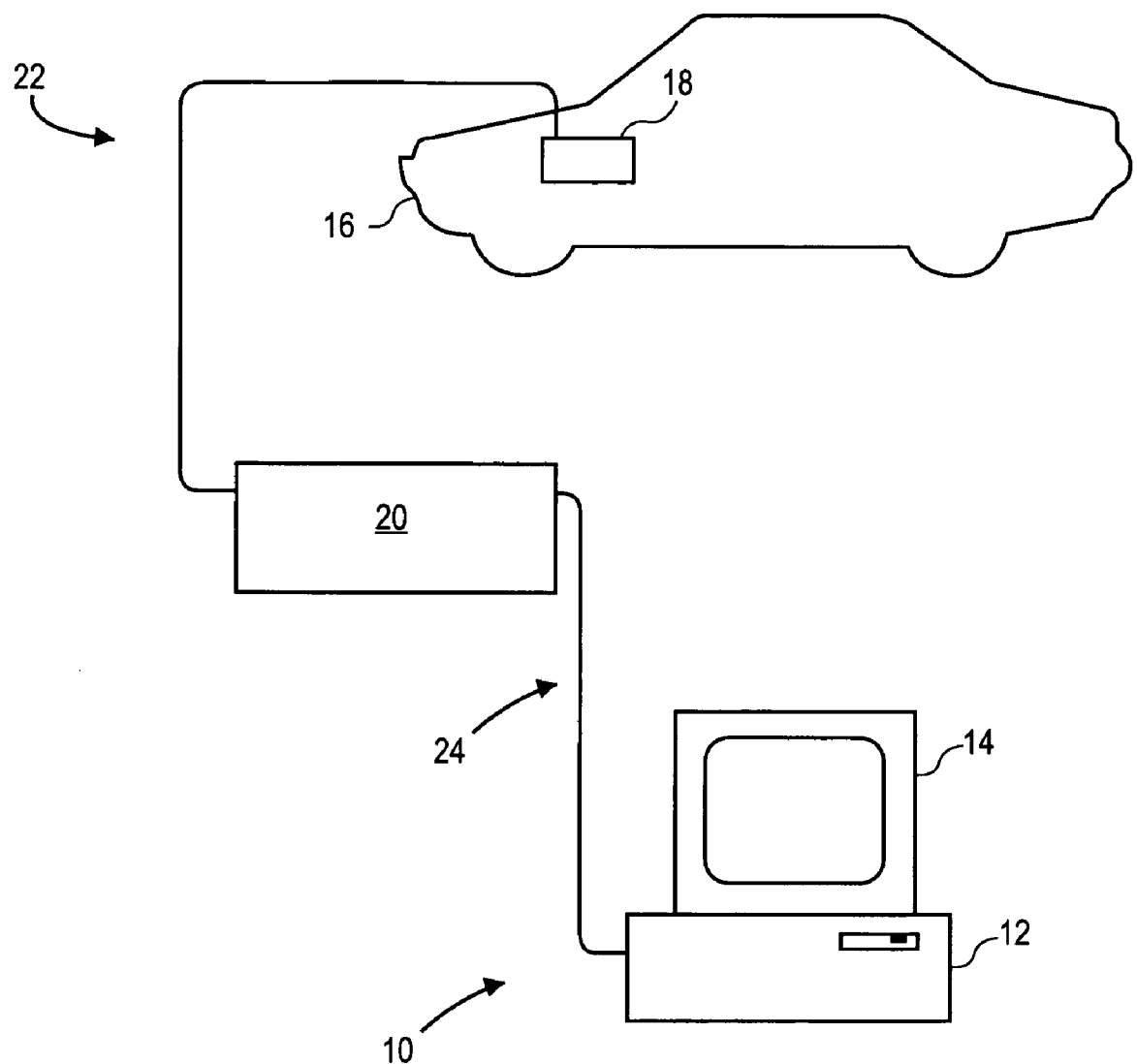
FIG. 1 illustrates an exemplary vehicle diagnostic test setup of a type suitable for carrying out the functions of an embodiment of the invention.

An embodiment of the present invention provides a vehicle state tracker that facilitates performance of vehicle diagnostic test sequences by tracking the state of the subject vehicle during and between individual diagnostic test procedures. The vehicle state tracker can help to eliminate duplication of efforts during a diagnostic test sequence by keeping track of the current vehicle test configuration and providing test preparation steps to reconfigure the vehicle between individual diagnostic procedures without redundant steps. The vehicle state tracker can track the current state of the vehicle by maintaining a current list of preconditions, or vehicle test configuration information.

The vehicle state tracker can include a precondition determiner that can determine the preconditions required for a subsequent diagnostic procedure, a state reader that can read a current state, for example, from a memory register, and a setting verifier than can verify the current setting of the vehicle state with regard to an individual precondition required for the diagnostic procedure. The vehicle state tracker can also include a test prep step formatter that can format a test preparation step related to a required precondition for display on a display device, if the precondition is required for the test procedure and the current setting of the vehicle state corresponding to the precondition is not valid. The vehicle state tracker can further include a feedback receiver that can receive feedback from a user, the vehicle or test equipment indicating that the required precondition has been satisfied, and a state updater that can update the vehicle state, for example, in a memory register, to reflect the status of the precondition.

Similarly, the vehicle state tracker can determine a vehicle condition that is not required for the subsequent diagnostic procedure, verify the current setting of the vehicle state with regard to the condition, and format a test preparation step that instructs the vehicle technician to reverse the condition, if the condition is not required for the subsequent test procedure and the current setting is valid.

The terms "valid" and "invalid" as used in this disclosure regarding the vehicle state settings corresponding to preconditions describe the vehicle state setting. As used in this disclosure, the term "valid" means that the current setting indicates that the precondition is set, indicating that the precondition is currently met or the corresponding vehicle test configuration is currently set up. Correspondingly, the terms "invalid" or "not valid" as used in this disclosure mean that the current vehicle state setting is not set, indicating that the corresponding precondition is not currently met or that the corresponding vehicle test configuration is not currently set up.

An embodiment of the vehicle state tracker can complement or can be an integral part of a diagnostic test procedure generator. An example of a diagnostic test procedure generator that is compatible with the interactive diagnostic schematic generator is disclosed in copending U.S. Patent Application, entitled "Diagnostic Decision Sequencing Method and Apparatus for Optimizing a Diagnostic Test Plan," filed concurrently herewith by Fountain, et al., the disclosure of which is hereby incorporated by reference in its entirety.

The invention will now be described with reference to the drawing figures, in which like reference numerals refer to like parts throughout. FIG. 1 illustrates a vehicle test configuration that is compatible with the present inventive method and apparatus. A vehicle state tracker 10 can include a personal computer 12 with a display device 14. The vehicle state tracker 10 can be coupled to a vehicle 16, including, for example, a vehicle onboard computer 18. For example, the vehicle state tracker 10 can be coupled to the vehicle onboard computer 18 by way of a vehicle interface box 20, as shown in FIG. 1. The vehicle test configuration can further include electrical links 22, 24, such as wires, cables, data buses, a communication network or a wireless network. The vehicle state tracker 10 can display diagnostic test procedure instructions to a vehicle technician to aid in performing vehicle diagnostics. The vehicle state tracker 10 can also receive feedback from the vehicle 16.

Figure 2:
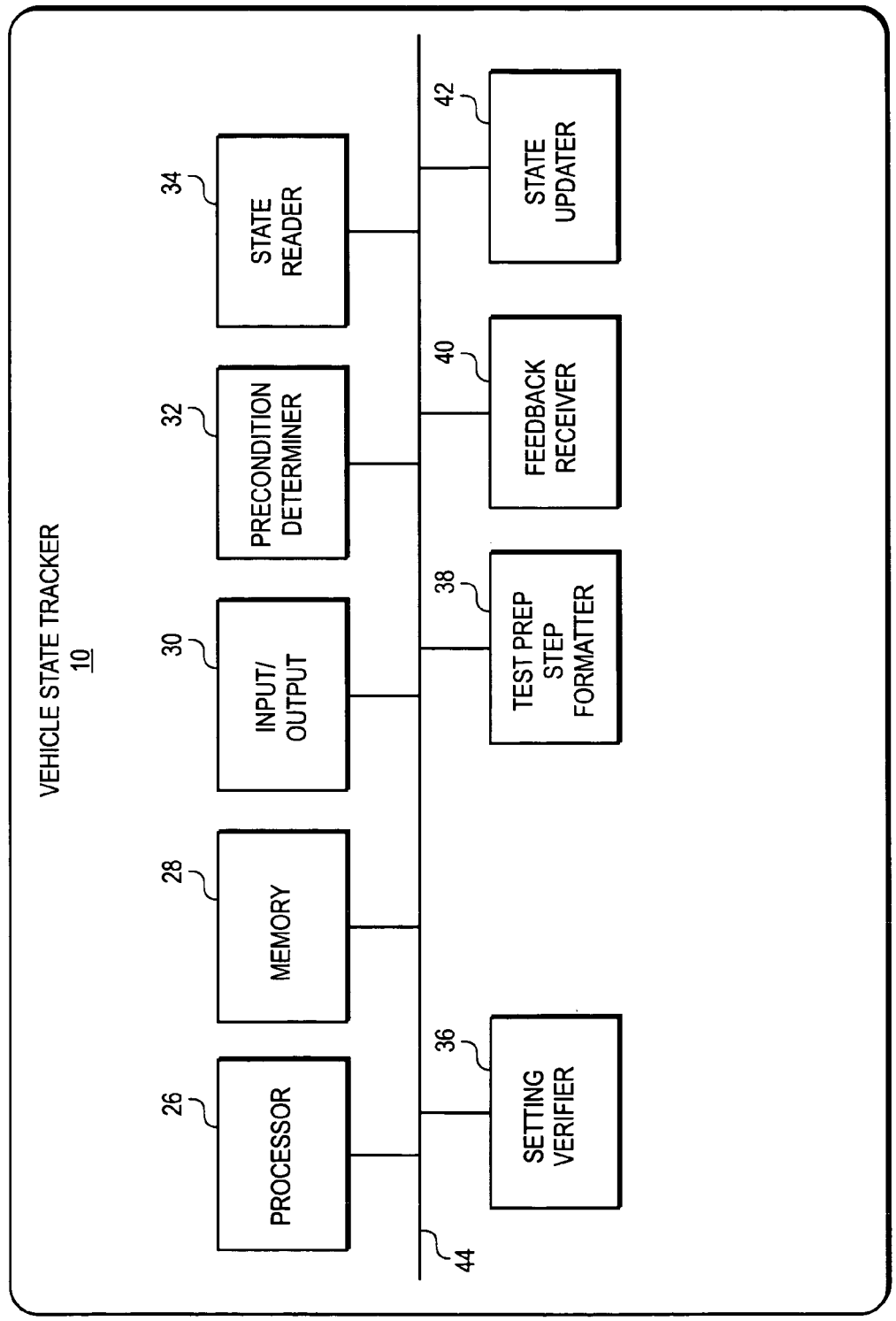
FIG. 2 is a schematic diagram illustrating a vehicle state tracker according to a preferred embodiment of the invention.

As illustrated in FIG. 2, a vehicle state tracker 10 can include a processor 26, a memory 28, an input/output device 30, a precondition determiner 32, a state reader 34, a setting verifier 36, a test preparation step formatter 38, a feedback receiver 40, and a state updater 42, all of which can be interconnected by a data link 44. The processor 12, the memory 14, the input/output device 16 and the display device 34 can be part of a general computer, such as a personal computer (PC), a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components can include programming code, such as source code, object code or executable code, stored on a computer-readable medium that can be loaded into the memory 14 and processed by the processor 12 in order to perform the desired functions of the vehicle state tracker 10.

In various embodiments, the vehicle state tracker 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the vehicle state tracker 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the vehicle state tracker 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

The precondition determiner 32 can determine a set of preconditions, or vehicle test configuration requirements, necessary for an individual diagnostic test procedure. Preconditions and corresponding test preparation steps can be created, or authored, for example, by an expert diagnostics technician. Preconditions can also be formatted to be reusable in various diagnostic test procedures, which can save time during the authoring phase of diagnostic test procedures. In operation, the precondition determiner 32 typically can determine the preconditions required for a subsequent diagnostic test procedure before the completion of a current diagnostic test procedure in order to prevent or minimize redundant efforts at the completion of the current diagnostic procedure and at the initiation of the subsequent diagnostic procedure.

The state reader 34 can read a current state of the vehicle, for example, from a memory register. In some embodiments, the vehicle state can be stored in a processor register, while in other embodiments the vehicle state can be stored in a main memory register or in a memory register of a storage device associated with the personal computer 12. The setting verifier 36 can verify a current setting of the vehicle state with regard to a specific precondition, or a group of current settings corresponding to a number of preconditions.

Regarding a precondition that is required for the subsequent test procedure, if the corresponding vehicle state setting is currently not valid, the test preparation step formatter 38 can format a test preparation step for display on the display device 14 to instruct the vehicle technician to set up the required precondition or vehicle test configuration. Of course, if the precondition is required for the subsequent test procedure and the corresponding vehicle state setting is currently valid, the test preparation step formatter 38 may elect not to format a test preparation step for display.

Thus, the test preparation step can be displayed to the vehicle technician to instruct the technician to satisfy a required precondition for the diagnostic procedure. Correspondingly, if the precondition was required for the current diagnostic procedure and as also required for the subsequent diagnostic procedure, the vehicle diagnostic system does not instruct the vehicle technician to perform redundant vehicle test configuration setup labor. As a result, the vehicle state tracker 10 can help eliminate repetitive steps, facilitating a faster and more accurate diagnosis of a vehicle operational problem.

In addition, the vehicle state tracker 10 can include a feedback receiver 40 that can receive feedback indicating when the precondition has been satisfied. For example, the feedback receiver 40 can receive a data signal from the vehicle onboard computer 18 indicating that the precondition has been satisfied. Similarly, the feedback receiver 40 can receive a feedback signal from test equipment, such as a digital multimeter, coupled to the vehicle 16. Otherwise, the feedback receiver 40 can receive user input from the vehicle technician by way of the input/output device 30 indicating that the precondition has been satisfied, or that the vehicle technician has complied with the test preparation step instructions.

Once the precondition has been satisfied, the state updater 42 can update the vehicle state, for example, in a memory register, to reflect a valid setting corresponding to the precondition. Thus, the vehicle state can be continuously updated to maintain a current and accurate vehicle state that is available to the diagnostic system at any time in order to determine test preparation steps required to reconfigure the vehicle 16 between diagnostic procedures in a diagnostic test sequence.

In the case that the vehicle condition is currently valid but is not required for a subsequent test procedure, the test preparation step formatter 38 can format a test preparation step for display instructing the vehicle technician to reverse, or undo, the vehicle condition. Correspondingly, the feedback receiver 40 can receive feedback as described above indicating that the condition has been reversed, and the state updater 42 can update the vehicle state, for example, in a memory register, to reflect an invalid setting corresponding to the condition, or precondition.

The vehicle state tracker 10 can maintain vehicle state settings for any number of vehicle preconditions associated with the diagnostic test procedures. For example, preconditions can include the following:
- an ignition switch position
- an engine run condition
- a throttle position
- an engine speed
- a vehicle speed
- a test equipment connection
- a vehicle electrical connection condition
- an ambient air temperature
- an engine inlet temperature
- an engine lubricant pressure
- an engine lubricant temperature
- an engine lubricant level
- an engine coolant temperature
- an engine coolant specific gravity
- an engine exhaust gas temperature
- an engine exhaust gas content
- a transmission setting
- a brake pedal position
- a parking brake position
- a brake fluid pressure
- a fuel level
- a fuel supply pressure
- a battery voltage
- a battery charging system voltage
- a battery charging system current
- an ignition voltage
- an ignition current
- an engine cylinder compression
- a vehicle configuration, or
- a vehicle modification.

As an operational example, in preparation for performing a diagnostic procedure on a vehicle to determine if a throttle position sensor (TPS) terminal wire is shorted to the battery positive voltage source, the precondition determiner 32 may determine that the following four preconditions must be met:
- ignition switch "on"
- TPS connector disconnected
- voltmeter (VOM) red lead connected to TPS connector socket
- voltmeter (VOM) black lead connected to electrical ground The state reader 34 may then read the current state of the vehicle from a memory register, and the setting verifier 36 may determine that the ignition switch is currently "on" (valid), but that the remaining three preconditions are currently not valid. As a result, the test preparation step formatter 38 can format a graphical user interface window for display on a display device with the following test preparation steps:

Disconnect TPS

Connect VOM red lead to TPS connector socket

Connect VOM black lead to battery negative post

After completing the required test preparation steps, the vehicle technician can provide a user input by way of the input/output device, such as a keyboard, a mouse, or a sylus, to indicate that the test preparation steps have been completed. The user input can be received by the feedback receiver 40, and in response, the state updater 42 can write the new vehicle state including the three newly valid preconditions to the memory register.

Figure 3:
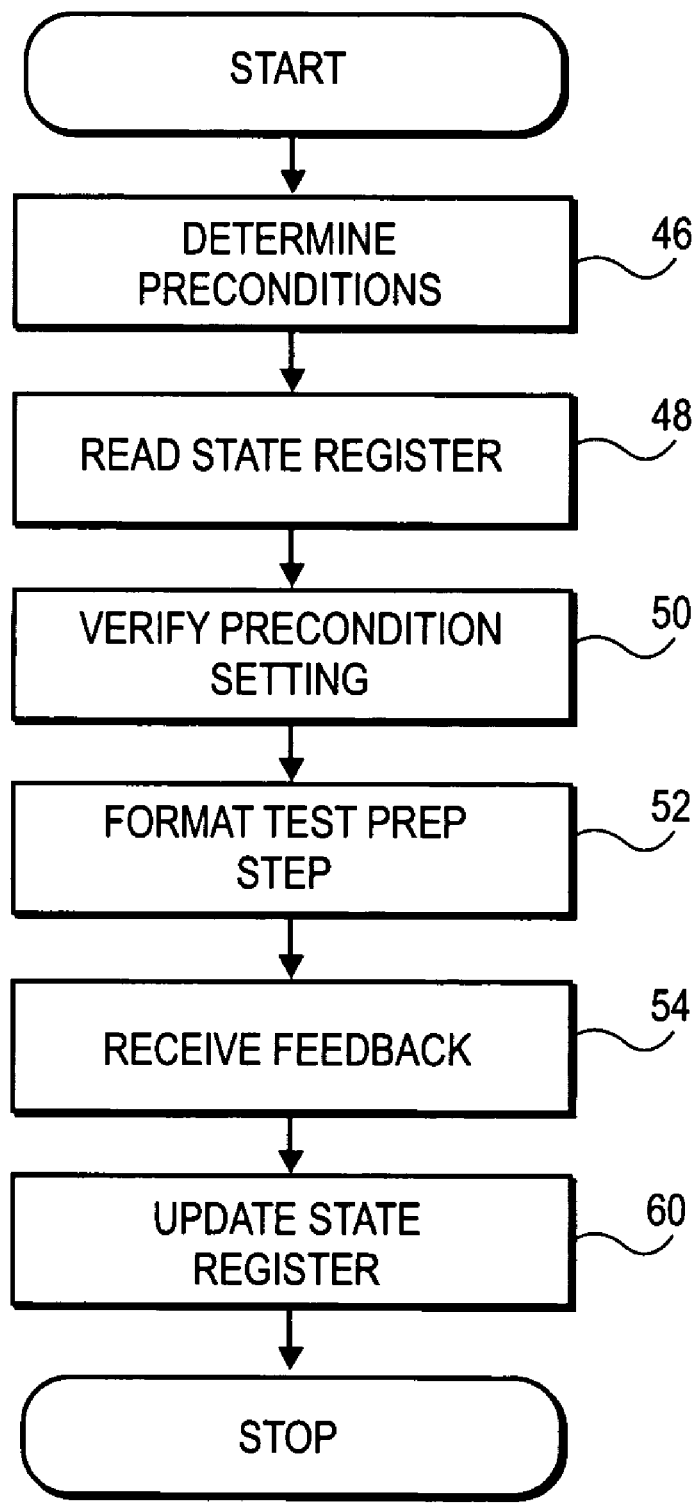
FIG. 3 is a flowchart illustrating steps that may be followed to track the state of a vehicle in accordance with one embodiment of the method or process.

FIG. 3 is a flowchart illustrating a sequence of steps that can be performed in order to track the state of a vehicle during a diagnostic test sequence. The process can begin by proceeding to step 46, "Determine Preconditions," in which a precondition or a group of preconditions required for an individual diagnostic test procedure can be determined. As described above, preconditions typically are determined for a subsequent test procedure, that is to follow a current procedure that has not yet been completed, in order to avoid repetitive steps during the transition from the current diagnostic procedure to the subsequent diagnostic procedure.

Then, in step 48, "Read State Register," a vehicle state can be read, for example, from a memory register. As described above, the vehicle state can be stored in a processor register, a main memory or a peripheral storage device. After the preconditions have been determined and the current vehicle state has been read, in step 50, "Verify Precondition Setting," the current setting of the vehicle state corresponding to a specific precondition can be verified. For example, an individual bit in a memory register can be verified.

If the precondition is required for the subsequent diagnostic test procedure and the current vehicle state setting corresponding to the precondition is not valid, in step 52, "Format Test Preparation Step," a test preparation step can be formatted for display on a display device instructing the vehicle technician to satisfy the precondition, or set up the corresponding vehicle condition. Otherwise, if the precondition is not required for the subsequent diagnostic procedure and the current vehicle state setting corresponding to the precondition is valid, a test preparation step can be formatted instructing the vehicle technician to reverse the vehicle condition corresponding to the precondition.

Next, in step 54, "Receive Feedback," feedback can be received indicating either that the precondition has been satisfied or that the corresponding vehicle condition has been reversed. As described above, the feedback can be received as a data signal from the vehicle onboard computer, a test equipment signal from test equipment coupled to the vehicle, or user input.

At this point, in step 60, "Update State Register," the vehicle state setting corresponding to the precondition can be updated to indicate either that the precondition has been satisfied (valid) or that the corresponding vehicle condition has been reversed (invalid). In this way, the current and accurate state of the vehicle configuration and conditions can be maintained, for example, in a memory register. Tracking the current vehicle state by this process can facilitate efficient vehicle diagnostic testing by eliminating or minimizing duplicative efforts between diagnostic test steps in a diagnostic test sequence.

FIGS. 2 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 2 depicts the apparatus of one embodiment including several of the key components of a general purpose computer by which an embodiment of the present invention may be implemented. Those of ordinary skill in the art will appreciate that a computer can include many more components than those shown in FIG. 2. However, it is not necessary that all of these generally conventional components be shown in order to disclose an illustrative embodiment for practicing the invention. The general purpose computer can include a processing unit 26 and a system memory 28, which may include random access memory (RAM) and read-only memory (ROM). The computer also may include nonvolatile storage memory, such as a hard disk drive, where additional data can be stored.

An embodiment of the present invention can also include one or more input or output devices 30, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN), wide area network (WAN), the Internet, or the like, and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of tracking a state of a vehicle during a diagnostic test sequence, comprising:
    determining a precondition required for a diagnostic test;
    reading a state register;
    verifying a current first setting of the state register corresponding to the precondition;
    determining a vehicle condition not required for the diagnostic test;
    verifying a current second setting of the state register corresponding to the condition; and
    specifying a second test preparation step related to the condition based on the second setting being valid.

2. The computer-implemented method of claim 1, further comprising specifying a first test preparation step related to the precondition based on the first setting being invalid.

3. The computer-implemented method of claim 2, wherein the first test preparation step instructs a user to satisfy the precondition.

4. The computer-implemented method of claim 1, further comprising receiving a feedback indicating that the precondition has been satisfied, wherein the feedback is one selected from the following: vehicle onboard computer data, test equipment data, and a user input.

5. The computer-implemented method of claim 1, further comprising updating the state register to reflect a valid setting corresponding to the precondition.

6. The computer-implemented method of claim 1, further comprising proceeding without specifying a first test preparation step related to the precondition based on the first setting being valid.

7. The computer-implemented method of claim 1, wherein the second test preparation step instructs a user to reverse the vehicle condition.

8. The computer-implemented method of claim 1, further comprising receiving a feedback indicating that the condition has been reversed, wherein the feedback is one selected from the following:
    vehicle onboard computer data, test equipment data, and a user input.

9. The computer-implemented method of claim 1, further comprising updating the state register to reflect an invalid setting corresponding to the condition.

10. The computer-implemented method of claim 1, wherein the precondition corresponds to one selected from the following:
    an ignition switch position, an engine run condition, a throttle position, an engine speed, a vehicle speed, a test equipment connection, a vehicle electrical connection condition, an ambient air temperature, an engine inlet air temperature, an engine lubricant pressure, an engine lubricant temperature, an engine lubricant level, an engine coolant temperature, an engine coolant specific gravity, an engine exhaust gas temperature, an engine exhaust gas oxygen content, a transmission setting, a brake pedal position, a parking brake position, a brake fluid pressure, a fuel level, a fuel supply pressure, a battery voltage, a battery charging system voltage, a battery charging system current, an ignition voltage, an ignition current, an engine cylinder compression, a vehicle configuration, and a vehicle modification.

11. A computer program product for tracking a state of a vehicle during a diagnostic test sequence, including a computer-readable medium encoded with instructions configured to be executed by a processor in order to perform predetermined operations comprising:
    determining a precondition required for a diagnostic test;
    reading a state register;
    verifying a current first setting of the state register corresponding to the precondition;
    determining a vehicle condition not required for the diagnostic test;
    verifying a current second setting of the state register corresponding to the condition; and
    specifying a second test preparation step related to the condition based on the second setting being valid.

12. The computer program product of claim 11, wherein the predetermined operations further comprise specifying a first test preparation step related to the precondition based on the first setting being invalid.

13. The computer program product of claim 11, wherein the predetermined operations further comprise receiving a feedback indicating that the precondition has been satisfied, wherein the feedback is one selected from the following:
    vehicle onboard computer data, test equipment data, and a user input.

14. The computer program product of claim 11, wherein the predetermined operations further comprise updating the state register to reflect a valid setting corresponding to the precondition.

15. The computer program product of claim 11, wherein the predetermined operations further comprise proceeding without specifying a first test preparation step related to the precondition based on the first setting being valid.

16. The computer program product of claim 11, wherein the predetermined operations further comprise receiving a feedback indicating that the condition has been reversed, wherein the feedback is one selected from the following:
    vehicle onboard computer data, test equipment data, and a user input.

17. The computer program product of claim 11, wherein the predetermined operations further comprise updating the state register to reflect an invalid setting corresponding to the condition.

18. A diagnostic tool for tracking a state of a vehicle during a diagnostic test sequence, comprising:
   a precondition determiner configured to determine a precondition required for a diagnostic test;
   a state reader configured to read a state register;
   a setting verifier configured to verify a state register; and
   a test preparation step specifier configured to specify a first test preparation step related to the precondition based on the first setting being invalid, wherein the precondition determiner is further configured to determine a vehicle condition not required for the diagnostic test, the setting verifier is further configured to verify a current second setting of the state register corresponding to the condition, and the test preparation step specifier is further configured to specify a second test preparation step related to the condition based on the second setting being valid.

19. The diagnostic tool of claim 18, further comprising a feedback receiver configured to receive a feedback indicating that the precondition has been satisfied, wherein the feedback is one selected from the following:
   vehicle onboard computer data, test equipment data, and a user input.

20. The diagnostic tool of claim 18, further comprising a state updater configured to update the state register to reflect a valid setting corresponding to the precondition.

21. The diagnostic tool of claim 18, wherein the test preparation step specifier is further configured to specify the first test preparation step only in the case that the first setting is invalid.

22. The diagnostic tool of claim 18, wherein the feedback receiver is further configured to receive a feedback indicating that the condition has been reversed, wherein the feedback is one selected from the following: vehicle onboard computer data, test equipment data, and a user input; and
   the state updater is further configured to update the state register to reflect an invalid setting corresponding to the condition.

* * * * *